United States Patent
Zhang

(10) Patent No.: US 10,564,440 B2
(45) Date of Patent: Feb. 18, 2020

(54) DISPLAY SUBSTRATE AND MANUFACTURING METHOD THEREOF, DISPLAY DRIVING METHOD, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 74 days.

(21) Appl. No.: 15/511,134

(22) PCT Filed: Apr. 5, 2016

(86) PCT No.: PCT/CN2016/078417
§ 371 (c)(1),
(2) Date: Mar. 14, 2017

(87) PCT Pub. No.: WO2016/180099
PCT Pub. Date: Nov. 17, 2016

(65) Prior Publication Data
US 2017/0285358 A1    Oct. 5, 2017

(30) Foreign Application Priority Data

May 13, 2015  (CN) .......................... 2015 1 0242969

(51) Int. Cl.
*G02B 27/22*    (2018.01)
*G02F 1/133*    (2006.01)
*G02F 1/1333*   (2006.01)

(52) U.S. Cl.
CPC ......... *G02B 27/2264* (2013.01); *G02F 1/133* (2013.01); *G02F 1/1333* (2013.01); *G02F 2001/133342* (2013.01)

(58) Field of Classification Search
CPC ... G02B 27/2264; G02F 1/1333; G02F 1/133; G02F 1/167; G02F 2001/13342;
(Continued)

(56) References Cited

U.S. PATENT DOCUMENTS

2002/0145792 A1* 10/2002 Jacobson ................... B41J 2/01
359/296
2004/0169912 A1*  9/2004 Liang ..................... G02F 1/167
359/296

(Continued)

FOREIGN PATENT DOCUMENTS

CN    102466917 A    5/2012
CN    202977420 U    6/2013
(Continued)

OTHER PUBLICATIONS

Written Opinion of the International Searching Authority from corresponding PCT Application No. PCT/CN2016/078417, dated Jun. 29, 2016 (4 pages).

(Continued)

*Primary Examiner* — Roberto W Flores
(74) *Attorney, Agent, or Firm* — Dave Law Group LLC; Raj S. Dave

(57) ABSTRACT

Embodiments of the present disclosure provide a display substrate and a manufacturing method thereof, a display driving method and a display device. The display substrate includes: a transparent base; a bidirectional light emitting element array emitting light in a first direction and a second direction perpendicular to the transparent base; a first variable grating array transmits or blocks the light emitted by (Continued)

odd-numbered columns of bidirectional light emitting elements in the first direction; a second variable grating array transmits or blocks the light emitted by odd-numbered columns of bidirectional light emitting elements in the second direction; a third variable grating array transmits or blocks the light emitted by even-numbered columns of bidirectional light emitting elements in the first direction; and a fourth variable grating array transmits or blocks the light emitted by even-numbered columns of bidirectional light emitting elements in the second direction. Multiple display modes can be realized.

18 Claims, 5 Drawing Sheets

(58) Field of Classification Search
CPC ............ H01L 27/3246; H01L 27/3286; H01L 27/3267; H01L 27/3227; G09G 3/3225; G09G 3/344; G09G 2310/068
See application file for complete search history.

(56) References Cited

U.S. PATENT DOCUMENTS

| | | | |
|---|---|---|---|
| 2007/0195399 A1* | 8/2007 | Aylward | G02F 1/1347 359/296 |
| 2008/0303982 A1* | 12/2008 | Jin | G02F 1/1335 349/69 |
| 2012/0105771 A1 | 5/2012 | Oka et al. | |
| 2012/0250141 A1* | 10/2012 | Chen | G02B 1/06 359/320 |
| 2013/0155506 A1 | 6/2013 | Kwon et al. | |
| 2014/0184660 A1* | 7/2014 | Fujino | G09G 3/003 345/690 |
| 2014/0252336 A1* | 9/2014 | Kobayashi | G09G 3/3225 257/40 |
| 2016/0238917 A1 | 8/2016 | Zhang | |

FOREIGN PATENT DOCUMENTS

| | | |
|---|---|---|
| CN | 103353701 A | 10/2013 |
| CN | 103698828 A | 4/2014 |
| CN | 104297968 A | 1/2015 |
| CN | 104391407 A | 3/2015 |
| CN | 104808350 A | 7/2015 |
| EP | 2682804 A1 | 1/2014 |
| EP | 3086157 A1 | 10/2016 |
| JP | 2003344827 A | 12/2003 |
| JP | 2014228777 A | 12/2014 |
| WO | WO-2012120575 A1 | 9/2012 |

OTHER PUBLICATIONS

Office Action from corresponding Chinese Application No. 201510242969.4, dated Aug. 18, 2016 (8 pages).

* cited by examiner

DISPLAY SUBSTRATE AND MANUFACTURING METHOD THEREOF, DISPLAY DRIVING METHOD, AND DISPLAY DEVICE

CROSS REFERENCE TO RELATED APPLICATIONS

This application is a National Stage of PCT/CN2016/078417 filed Apr. 5, 2016, which claims the benefit and priority of Chinese Patent Application No. 201510242969.4, filed May 13, 2015. The entire disclosures of the above applications are incorporated herein by reference.

BACKGROUND

The present disclosure relates to the field of display technology, and particularly to a display substrate and a manufacturing method thereof, a display driving method, and a display device.

With various display demands, it is necessary to provide a display device with extra display mode, such as a display device capable of simultaneous double-sided display, or a display device capable of a naked-eye 3D display, in addition to the conventional single-sided 2D display device. If a display device can provide the above-described various display modes, the applicability of the display device can be greatly improved. However, there is no such display device in the prior art which not only provides a single-sided 2D display mode and a double-sided 2D display mode, but also provides a naked-eye 3D display mode.

BRIEF DESCRIPTION

Embodiments of the present disclosure provide a display substrate and a manufacturing method thereof, a display driving method, and a display device.

According to a first aspect, embodiments of the present disclosure provide a display substrate including: a transparent base; a bidirectional light emitting element array formed on the transparent base, wherein the bidirectional light emitting element array includes a plurality of bidirectional light emitting elements configured to emit light in a first direction and a second direction perpendicular to the transparent base; a first variable grating array configured to transmit or block the light emitted by odd-numbered columns of bidirectional light emitting elements in the first direction; a second variable grating array configured to transmit or block the light emitted by odd-numbered columns of bidirectional light emitting elements in the second direction; a third variable grating array configured to transmit or block the light emitted by even-numbered columns of bidirectional light emitting elements in the first direction; and a fourth variable grating array configured to transmit or block the light emitted by even-numbered columns of bidirectional light emitting elements in the second direction. The variable grating arrays are configured to realize the transition between a transparent state and an opaque state under control of a control signal to transmit or block the emitted light.

In embodiments of the present disclosure, the odd-numbered columns of bidirectional light emitting elements are formed on the first direction side of the transparent base, and the even-numbered columns of bidirectional light emitting elements are formed on the second direction side of the transparent base.

In embodiments of the present disclosure, the second variable grating array is formed on the surface of the transparent base toward the first direction, and the odd-numbered columns of bidirectional light emitting elements are formed on the surface of the second variable grating array toward the first direction. The third variable grating array is formed on the surface of the transparent base toward the second direction, and the even-numbered columns of bidirectional light emitting elements are formed on the surface of the third variable grating array toward the second direction. The display substrate further includes a first transparent cover plate and a second transparent cover plate. The first transparent cover plate is arranged on the first direction side of the odd-numbered columns of bidirectional light emitting elements, and the first variable grating array is formed on the first transparent cover plate. The second transparent cover plate is arranged on the second direction side of the even-numbered columns of bidirectional light emitting elements, and the fourth variable grating array is formed on the second transparent cover plate.

In embodiments of the present disclosure, each of the variable grating arrays includes a plurality of strip-shaped electrode cases. The strip-shaped electrode case includes a transparent case body, a first pair of electrode plates and a second pair of electrode plates formed on the inner side walls of the transparent case body, a transparent liquid filled in the transparent case body, and opaque charged particles mixed in the transparent liquid. The first pair of electrode plates are perpendicular to the transparent base and are configured to form an electric field parallel to the transparent base. The second pair of electrode plates are parallel to the transparent base and are configured to form an electric field perpendicular to the transparent base.

In embodiments of the present disclosure, in each variable grating array, every strip-shaped electrode case is connected to the same control signal input terminal.

In embodiments of the present disclosure, the bidirectional light emitting element includes a first transparent electrode, a second transparent electrode, and a light emitting layer positioned between the first transparent electrode and the second transparent electrode.

In embodiments of the present disclosure, the bidirectional light emitting element is a color photoelectroluminescent element. The bidirectional light emitting element array includes bidirectional light emitting elements of N colors. Among any N consecutive columns of bidirectional light emitting elements, the color of light emitted by each column of bidirectional light emitting elements is different from the colors of light emitted by other columns of bidirectional light emitting elements. For the odd-numbered columns of bidirectional light emitting elements, among any N consecutive columns of bidirectional light emitting elements, the color of light emitted by each column of bidirectional light emitting elements is different from the colors of light emitted by other columns of bidirectional light emitting elements. For the even-numbered columns of bidirectional light emitting elements, among any N consecutive columns of bidirectional light emitting elements, the color of light emitted by each column of bidirectional light emitting elements is different from the colors of light emitted by other columns of bidirectional light emitting elements.

According to a second aspect, embodiments of the present disclosure provide a display driving method for driving the display substrate of any one of the above, including: applying a control signal to make the first variable grating array and the third variable grating array transparent and make other variable grating arrays opaque to perform single-sided 2D display in the first direction; applying a control signal to make the second variable grating array and the fourth variable grating array transparent and make other variable grating arrays opaque to perform single-sided 2D display in the second direction; applying a control signal to make the first variable grating array and the fourth variable grating array transparent and make other variable grating arrays opaque to perform double-sided 2D display.

In embodiments of the disclosure, the method further includes: applying a control signal to make the third variable grating array transparent and make other variable grating arrays opaque to perform 3D display in the first direction; applying a control signal to make the second variable grating array transparent and make other variable grating arrays opaque to perform 3D display in the second direction.

According to a third aspect, embodiments of the present disclosure provide a manufacturing method of a display substrate, including: forming a transparent base; forming a bidirectional light emitting element array and a plurality of variable grating arrays on the transparent base. The bidirectional light emitting element array includes a plurality of bidirectional light emitting elements configured to emit light in a first direction and a second direction perpendicular to the transparent base. The plurality of variable grating arrays include a first variable grating array, a second variable grating array, a third variable grating array, and a fourth variable grating array. The first variable grating array is configured to transmit or block the light emitted by odd-numbered columns of bidirectional light emitting elements in the first direction. The second variable grating array is configured to transmit or block the light emitted by odd-numbered columns of bidirectional light emitting elements in the second direction. The third variable grating array is configured to transmit or block the light emitted by even-numbered columns of bidirectional light emitting elements in the first direction. The fourth variable grating array is configured to transmit or block the light emitted by even-numbered columns of bidirectional light emitting elements in the second direction. The variable grating arrays are configured to realize the transition between a transparent state and an opaque state under control of a control signal to transmit or block the emitted light.

In embodiments of the present disclosure, forming a bidirectional light emitting element array on the transparent base includes forming odd-numbered columns of bidirectional light emitting elements on the first direction side of the transparent base and forming even-numbered columns of bidirectional light emitting elements on the second direction side of the transparent base.

According to a fourth aspect, embodiments of the present disclosure provide a display device including the display substrate of any one of the above.

According to the display substrate and the display device provided by the embodiments of the present disclosure, single-sided 2D display, double-sided 2D display, and naked-eye 3D display can be realized.

BRIEF DESCRIPTION OF THE DRAWINGS

In order to more clearly illustrate the technical solution in the embodiments of the present disclosure, the drawings of the embodiments will be briefly described below. It should be understood that the drawings described below merely relate to some embodiments of the present disclosure, rather than limit the present disclosure, in which.

DETAILED DESCRIPTION

Figure 1:
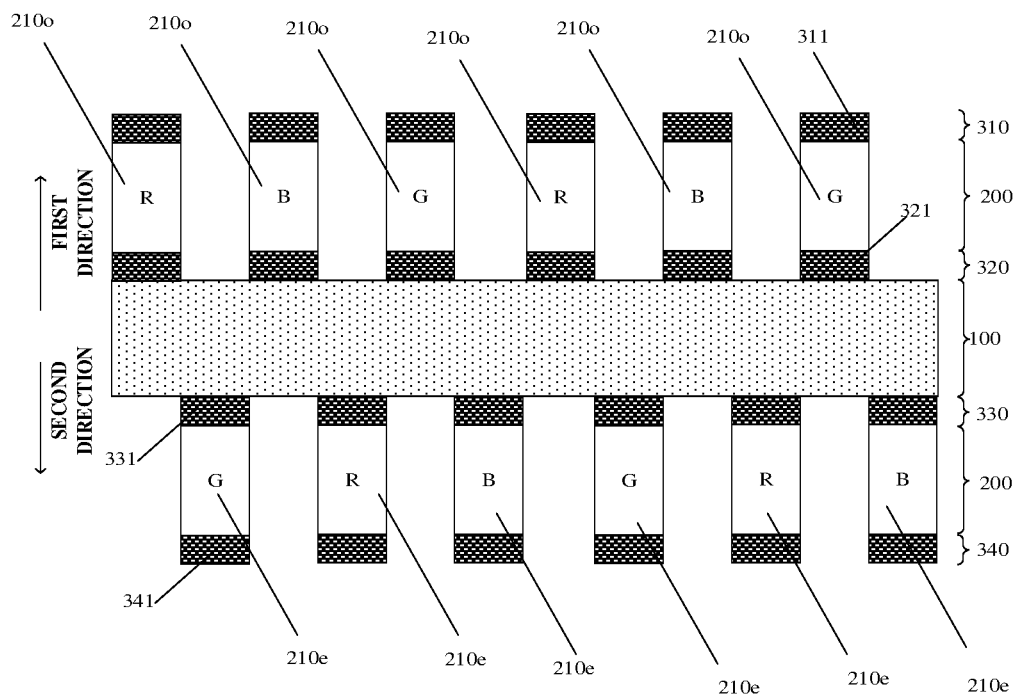
FIG. 1 is a schematic structural view of a display substrate provided according to a first embodiment of the present disclosure.

In order to make the technical solutions and advantages of the embodiments of the present disclosure more clear, the technical solutions in the embodiments of the present disclosure will be clearly and completely described below in conjunction with the accompanying drawings in the embodiments of the present disclosure. Obviously, the described embodiments are a part of the embodiments of the present disclosure, rather than all the embodiments. Based on the embodiments of the present disclosure, all other embodiments obtained by those skilled in the art without creative work fall within the scope of the present disclosure.

Embodiments of the present disclosure provide a display substrate including: a transparent base, and a bidirectional light emitting element array formed on the transparent base. The bidirectional light emitting element array includes a plurality of bidirectional light emitting elements configured to emit light in a first direction and a second direction perpendicular to the transparent base.

The display substrate further includes: a first variable grating array configured to transmit or block the light emitted by odd-numbered columns of bidirectional light emitting elements in the first direction, a second variable grating array configured to transmit or block the light emitted by odd-numbered columns of bidirectional light emitting elements in the second direction, a third variable grating array configured to transmit or block the light emitted by even-numbered columns of bidirectional light emitting elements in the first direction, and a fourth variable grating array configured to transmit or block the light emitted by even-numbered columns of bidirectional light emitting elements in the second direction.

The variable grating arrays are configured to realize the transition between a transparent state and an opaque state under control of a control signal to transmit or block the emitted light.

Embodiments of the present disclosure provide a display driving method for driving the display substrate of any one of the above, including: applying a control signal to make the first variable grating array and the third variable grating array transparent and make other variable grating arrays opaque to perform single-sided 2D display in the first direction, applying a control signal to make the second variable grating array and the fourth variable grating array transparent and make other variable grating arrays opaque to perform single-sided 2D display in the second direction, applying a control signal to make the first variable grating array and the fourth variable grating array transparent and make other variable grating arrays opaque to perform double-sided 2D display.

In embodiments of the present disclosure, the display driving method further includes: applying a control signal to make the third variable grating array transparent and make other variable grating arrays opaque to perform 3D display in the first direction; applying a control signal to make the second variable grating array transparent and make other variable grating arrays opaque to perform 3D display in the second direction.

The display substrate and the display driving method provided by the embodiments of the present disclosure can realize single-sided 2D display, double-sided 2D display, and naked-eye 3D display. The display substrate and the display driving method provided by the embodiments of the present disclosure will be described exemplarily in conjunction with some specific structures.

FIG. 1 is a schematic structural view of a display substrate provided according to a first embodiment of the present disclosure. As shown in FIG. 1, a first embodiment of the present disclosure provides a display substrate including a transparent base 100, a bidirectional light emitting element array 200 formed on an upper surface and a lower surface of the transparent base 100 (composed of individual bidirectional light emitting element 210e and 201o in the figure, wherein the bidirectional light emitting elements in odd-numbered columns are denoted as 210o, and the light emitting elements in even-numbered columns are denoted as 210e). The bidirectional light emitting elements 210o in odd-numbered columns are formed on the upper surface of the transparent base 100, and the bidirectional light emitting elements 210e in even-numbered columns are formed on the lower surface of the transparent base 100. Each bidirectional light emitting element in the bidirectional light emitting element array can emit light in a first direction (the upward direction in the figure is the first direction) and a second direction (the downward direction in the figure is the second direction) perpendicular to the transparent base 100.

The display substrate further includes: a first variable grating array 310, a second variable grating array 320, a third variable grating array 330, and a fourth variable grating array 340. Each of the variable grating arrays is capable of realizing the transition between a transparent state and an opaque state under control of an accessed control signal.

The first variable grating array 310 includes a plurality of grating strips (denoted as 311) arranged above the bidirectional light emitting elements 2 positioned on the upper surface of the transparent base 100. The position of each grating strip corresponds to the position of each column of bidirectional light emitting elements 210o among the bidirectional light emitting elements 200 positioned on the upper surface. The first variable grating array 310 is configured to block the light emitted upward by the bidirectional light emitting elements 210 positioned on the upper surface.

The second variable grating array 320 includes a plurality of grating strips (denoted as 321) arranged above the upper surface of the transparent base 100 and below the bidirectional light emitting elements positioned on the upper surface of the transparent base 100. The position of each grating strip corresponds to the position of each column of bidirectional light emitting elements 210o among the bidirectional light emitting elements 200 positioned on the upper surface. The second variable grating array 320 is configured to block the light emitted downward by the bidirectional light emitting elements 210 positioned on the upper surface.

The third variable grating array 330 includes a plurality of grating strips (denoted as 331) arranged on the lower surface of the transparent base 100 and above the bidirectional light emitting elements 210e positioned on the lower surface of the transparent base 100. The position of each grating strip corresponds to the position of each column of bidirectional light emitting elements among the bidirectional light emitting elements 200 positioned on the lower surface. The third variable grating array 330 is configured to block the light emitted upward by the bidirectional light emitting elements 210e positioned on the lower surface.

The fourth variable grating array 340 includes a plurality of grating strips (denoted as 341) arranged below the bidirectional light emitting elements 210 positioned on the lower surface of the transparent base 100. The position of each grating strip corresponds to the position of each column of bidirectional light emitting elements 210e among the bidirectional light emitting elements 200 positioned on the lower surface. The fourth variable grating array 340 is configured to block the light emitted downward by the bidirectional light emitting elements 210e positioned on the lower surface.

It is not difficult to understand that in embodiments of the present disclosure, the transparent state refers to a state in which light can be transmitted, and the opaque state refers to a state in which light is prohibited from being transmitted. For example, when the first variable grating array is in the transparent state, the upward light of the odd-numbered columns of bidirectional light emitting elements 210o can be transmitted, but when the first variable grating array is in the opaque state, the upward light of the odd-numbered columns of bidirectional light emitting elements 210o cannot be transmitted.

It is not difficult to understand that in the embodiment of the present disclosure, "configured to block" refers to being capable of making the corresponding variable grating array in the opaque state to block the light emitted by the corresponding bidirectional light emitting elements in the corresponding direction, according to the structure of the corresponding variable grating array and the position relationship with the blocked bidirectional light emitting elements. In particular implementations, it is possible to make each grating strip in each variable grating array correspond to the position of each bidirectional light emitting element in the blocked bidirectional light emitting elements, and each grating strip be consistent with the corresponding bidirectional light emitting element in width, such that when the variable grating array is opaque, the light of the corresponding bidirectional light emitting element is blocked.

A display driving method for performing display driving on the display substrate provided by the first embodiment of the present disclosure may include: applying a control signal to make the first variable grating array and the third variable grating array transparent and make other variable grating arrays opaque to perform single-sided 2D display in the first direction; applying a control signal to make the second variable grating array and the fourth variable grating array transparent and make other variable grating arrays opaque to perform single-sided 2D display in the second direction; applying a control signal to make the first variable grating array and the fourth variable grating array transparent and make other variable grating arrays opaque to perform double-sided 2D display.

In embodiments of the disclosure, the display driving method may further include: applying a control signal to make the third variable grating array transparent and make other variable grating arrays opaque to perform 3D display in the first direction; applying a control signal to make the second variable grating array transparent and make other variable grating arrays opaque to perform 3D display in the second direction.

Figure 2:
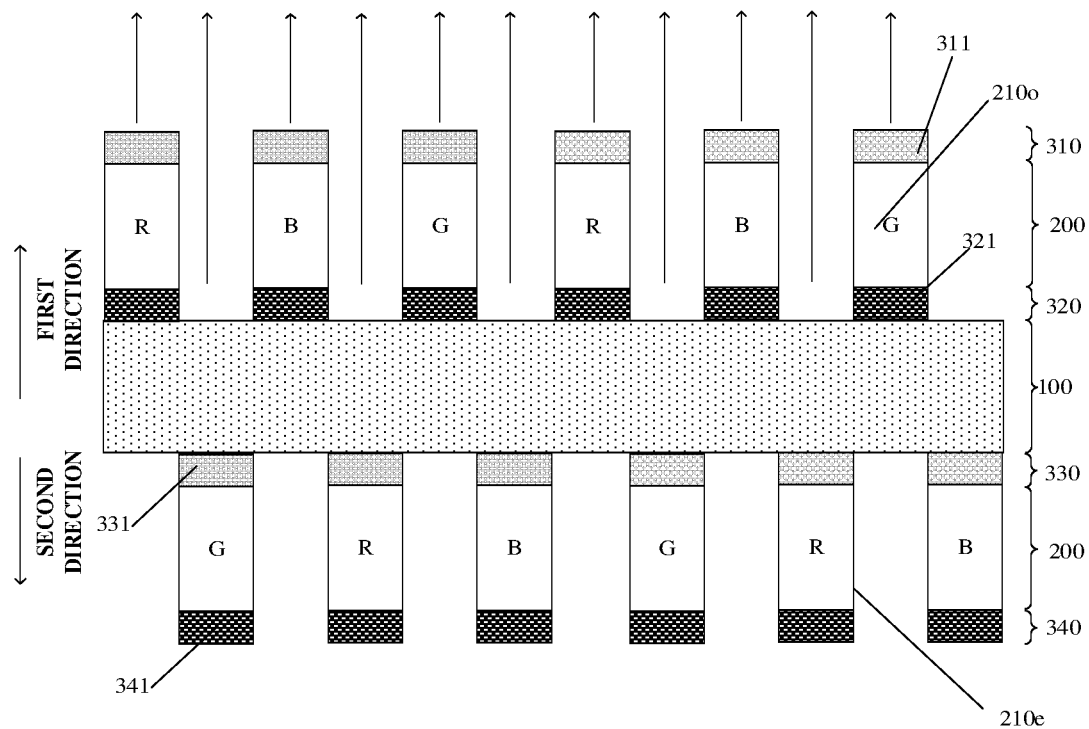
FIG. 2 is a schematic view of the display substrate shown in FIG. 1 for single-sided 2D display in the first direction.
Figure 3:
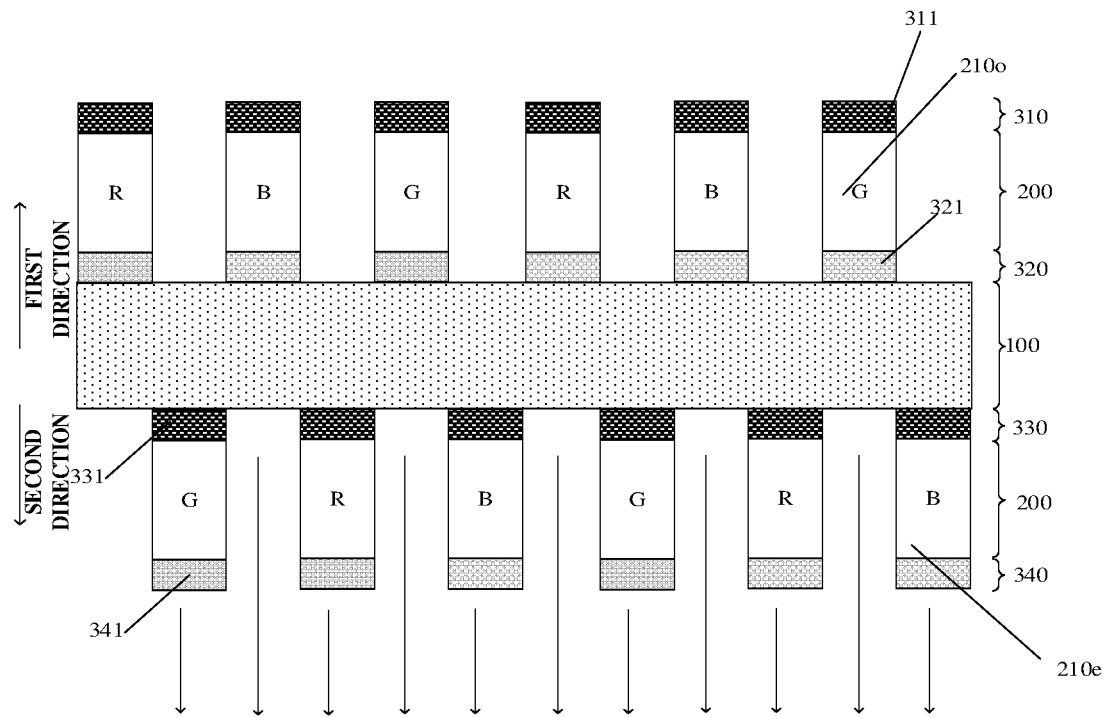
FIG. 3 is a schematic view of the display substrate shown in FIG. 1 for single-sided 2D display in the second direction.
Figure 4:
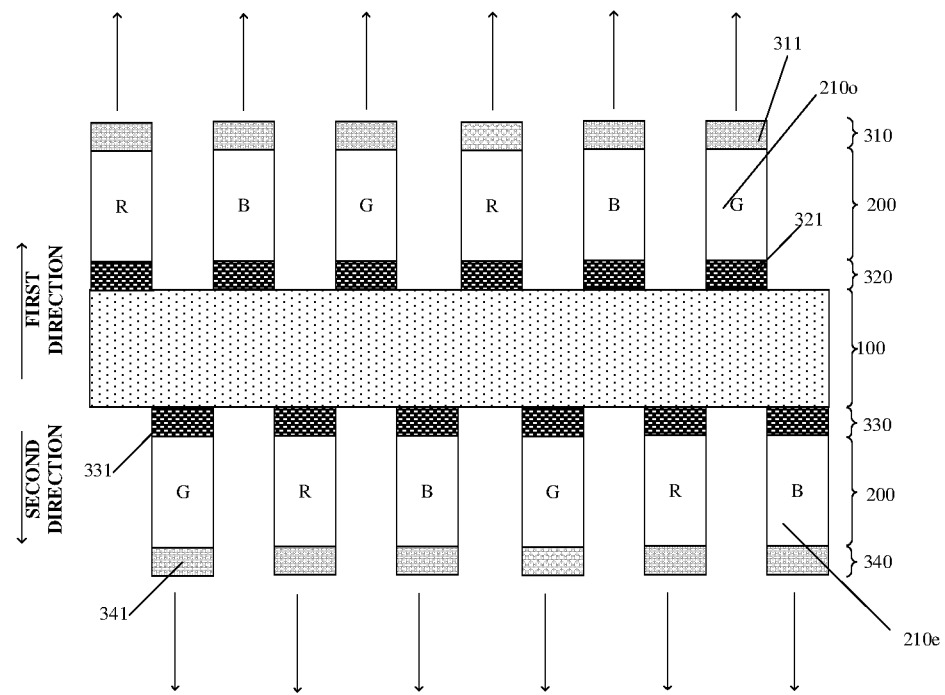
FIG. 4 is a schematic view of the display substrate shown in FIG. 1 for double-sided 2D display.
Figure 5:
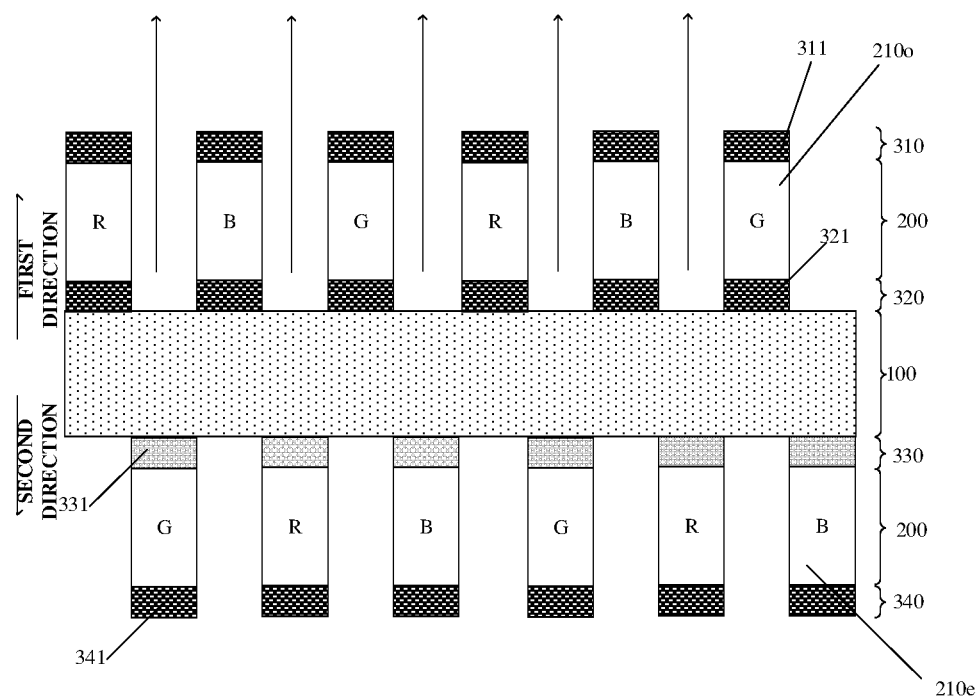
FIG. 5 is a schematic view of the display substrate shown in FIG. 1 for 3D display in the first direction.
Figure 6:
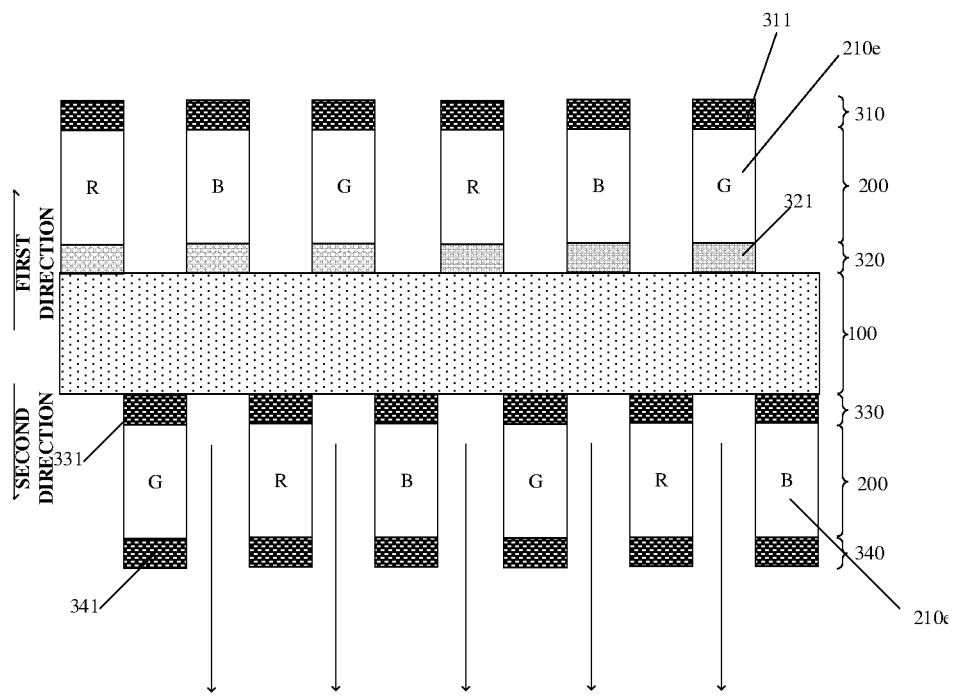
FIG. 6 is a schematic view of the display substrate shown in FIG. 1 for 3D display in the second direction.

FIG. 2 is a schematic view of the display substrate shown in FIG. 1 for single-sided 2D display in the first direction. FIG. 3 is a schematic view of the display substrate shown in FIG. 1 for single-sided 2D display in the second direction. FIG. 4 is a schematic view of the display substrate shown in FIG. 1 for double-sided 2D display. FIG. 5 is a schematic view of the display substrate shown in FIG. 1 for 3D display in the first direction. FIG. 6 is a schematic view of the display substrate shown in FIG. 1 for 3D display in the second direction.

As shown in FIG. 2, when it is necessary to perform upward single-sided 2D display, a control signal is applied to make the first variable grating array 310 and third variable grating array 330 transparent and make other variable grating arrays (the second variable grating array 320 and the fourth variable grating array 340) opaque. Thus, the bidirectional light emitting element 210o positioned on the upper surface of the base 100 and the bidirectional light emitting element 210e positioned on the lower surface of the base 100 are capable of and are only capable of emitting light upward, so as to realize upward single-sided 2D display.

As shown in FIG. 3, when it is necessary to perform downward single-sided 2D display, a control signal is applied to make the second variable grating array 320 and the fourth variable grating array 340 transparent and make other variable grating arrays (the first variable grating array 310 and third variable grating array 330) opaque. Thus, the bidirectional light emitting element 210o positioned on the upper surface of the base 100 and the bidirectional light emitting element 210e positioned on the lower surface of the base 100 are capable of and are only capable of emitting light downward, so as to realize downward single-sided 2D display.

As shown in FIG. 4, when it is necessary to perform upward and downward double-sided 2D display at the same time, a control signal is applied to make the first variable grating array 310 and fourth variable grating array 340 transparent and make other variable grating arrays (the second variable grating array 320 and the third variable grating array 330) opaque. Thus, the bidirectional light emitting element 210o positioned on the upper surface of the base 100 is capable of and is only capable of emitting light upward, and the bidirectional light emitting element 210e positioned on the lower surface of the base 100 is capable of and is only capable of emitting light downward, so as to realize double-sided 2D display.

As shown in FIG. 5, when it is necessary to perform upward 3D display, a control signal is applied to make the third variable grating array 330 transparent and make other variable grating arrays (the first variable grating array 310, the second variable grating array 320 and the fourth variable grating array 340) opaque. Thus, the bidirectional light emitting element 210o positioned on the upper surface of the base 100 cannot emit light upward or downward. The bidirectional light emitting element 210e positioned on the lower surface of the base 100 can emit light only upward. On the path where the bidirectional light emitting element 210e positioned on the lower surface of the base 100 emits light upward, the opaque first variable grating array 310 and second variable grating array 320 constitute the opaque grating required for the naked-eye 3D display, so as to realize upward naked-eye 3D display.

As shown in FIG. 6, when it is necessary to perform downward 3D display, a control signal is applied to make the second variable grating array 320 transparent and make other variable grating arrays (the first variable grating array 310, the third variable grating array 330 and the fourth variable grating array 340) opaque. Thus, the bidirectional light emitting element 210e positioned on the lower surface of the base 100 cannot emit light upward or downward. The bidirectional light emitting element 210o positioned on the upper surface of the base 100 can emit light only downward. On the path where the bidirectional light emitting element 210o positioned on the upper surface of the base 100 emits light downward, the opaque third variable grating array 330 and the fourth variable grating array 340 constitute the opaque grating required for the naked-eye 3D display, so as to realize downward naked-eye 3D display.

It can be seen that the display substrate and the corresponding display driving method provided by the first embodiment of the present disclosure can realize upward single-sided 2D display, downward single-sided 2D display, upward single-sided 3D display, downward single-sided 3D display, and concurrently upward and downward bidirectional 2D display. Also, in the first embodiment of the present disclosure, the bidirectional light emitting elements 210o in the odd-numbered columns and the bidirectional light emitting elements 210e in the even-numbered columns are positioned on different surfaces of the transparent base 100 and can avoid mutual influence on the light emitting and display.

In embodiments of the present disclosure, the variable grating array may include a plurality of strip-shaped electrode cases each including a transparent case body, a first pair of electrode plates and a second pair of electrode plates formed on the inner side walls of the transparent case body, a transparent liquid filled in the transparent case body, and opaque charged particles mixed in the transparent liquid. The first pair of electrode plates are perpendicular to the transparent base and are configured to form an electric field parallel to the transparent base. The second pair of electrode plates are parallel to the transparent base and are configured to form an electric field perpendicular to the transparent base.

Figure 7:
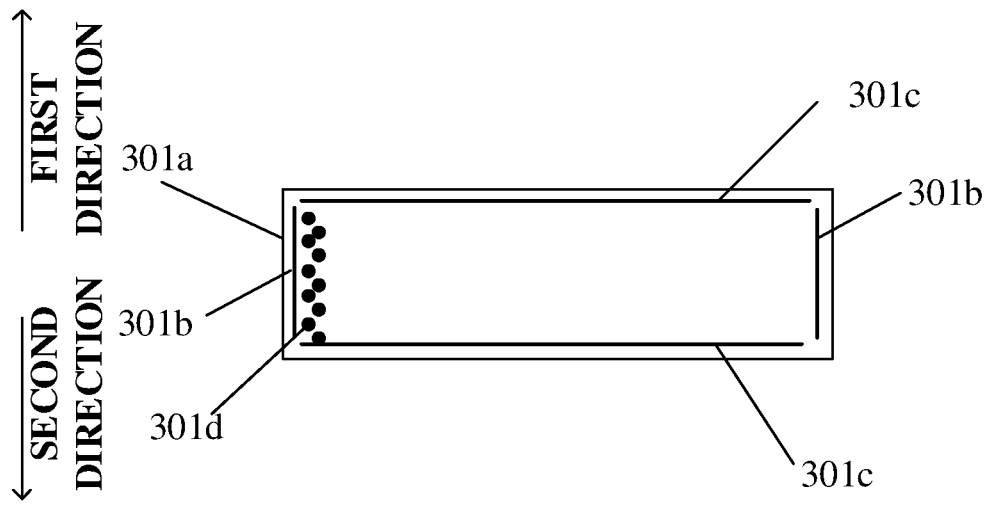
FIG. 7 is a schematic view of the transparent state of a strip-shaped electrode case of the variable grating array of the display substrate shown in FIG. 1.
Figure 8:
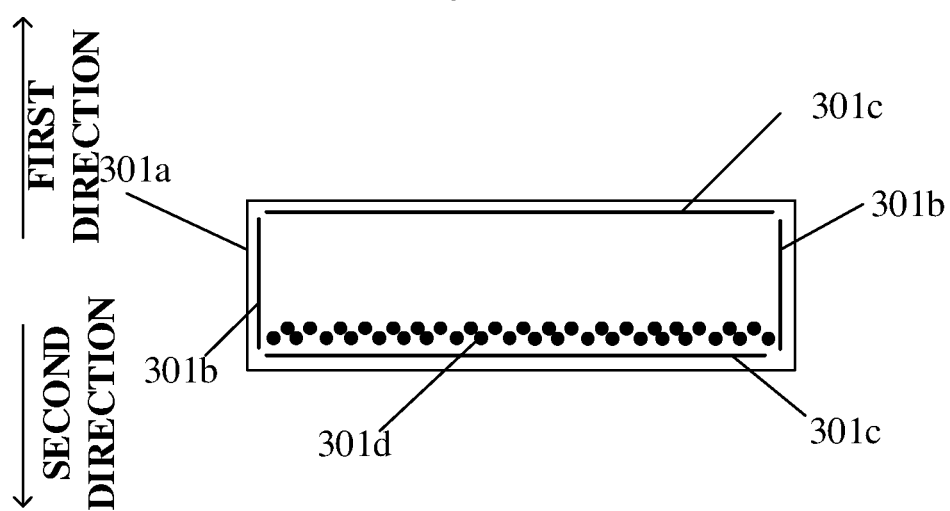
FIG. 8 is a schematic view of the blocking state of a strip-shaped electrode case of the variable grating array of the display substrate shown in FIG. 1.

FIG. 7 is a schematic view of the transparent state of the strip-shaped electrode case of the variable grating array of the display substrate shown in FIG. 1. FIG. 8 is a schematic view of the blocking state of the strip-shaped electrode case of the variable grating array of the display substrate shown in FIG. 1.

In particular implementations, the variable grating array described above may be implemented in various forms, as shown in FIG. 7 or FIG. 8, which illustrates one possible structure, the variable grating array includes a plurality of strip-shaped electrode cases. Each strip-shaped electrode case acts as a grating strip (311, 321, 331, 341) to block one column of bidirectional light emitting elements 210o or 210e among the columns of bidirectional light emitting elements 200 blocked by the variable grating array.

The strip-shaped electrode case includes a transparent case body 301a, two pairs of electrode plates 301b and 301c formed on the inner walls of the transparent case body 301a, a transparent liquid (not shown) filled in the transparent case body, and opaque charged particles 301d mixed in the transparent liquid. The first pair of electrode plates 301b are perpendicular to the transparent base to form an electric field parallel to the transparent base 100. The second pair of electrode plates 301c are parallel to the transparent base to form an electric field perpendicular to the transparent base 100.

In particular implementations, the transparent liquid here may be specifically oil and the like, and the opaque charged particles here may be microcapsules prepared by using an electrophoretic liquid composed of phthalocyanine green G and tetrachlorethylene as a core material. Further, it is possible to use an oil having a density identical with the density of the opaque charged particles as a transparent liquid, which has an advantage that the transparent or blocking state of the grating strips can be maintained without continually applying a voltage.

See FIG. 7, when a voltage is applied to the first pair of electrode plates 301b to generate an electric field, an electric field parallel to the transparent base 100 is formed. At this time, the opaque charged particles 301d in the transparent case body 301a are attracted onto one electrode plate in the first pair of electrode plates 310b (the left electrode plate shown in the figure), so as not to block the light emitted in the direction perpendicular to the transparent base 100, i.e., forming a transparent structure to the corresponding bidirectional light emitting element 210o or 210e. See FIG. 8, when a voltage is applied to the second pair of electrode plates 301c to generate an electric field, an electric field perpendicular to the transparent base 100 is formed. At this time, the opaque charged particles 301d in the transparent case body are attracted onto one electrode plate in the second pair of electrode plates 301c (the lower electrode plate shown in the figure), so as to block the light emitted upward or downward in the direction perpendicular to the transparent base 100, i.e., forming an opaque structure to the corresponding bidirectional light emitting element 210o or 210e.

The structure of the variable grating array of FIGS. 7 and 8 is simple and easy to control, compared with other types of variable grating arrays in the prior art. Of course, in practice, the use of variable grating arrays of other structure types (for example filling the photochromic material between the upper and lower electrodes) can also solve the basic problem to be solved by embodiments of the present disclosure, and the corresponding solution thereof should also fall within the scope of the present disclosure.

Further, in the variable grating arrays shown in FIGS. 7 and 8, in one variable grating array, the electrode plates in the same position on the inner walls of each strip-shaped electrode case may be connected to the same control signal input terminal. Since in the actual light emitting display, the transmission state of each grating strip in one variable grating array is the same in any display mode, the connection of the electrode plates in the same position on the inner walls of each strip-shaped electrode case to the same control signal input terminal does not affect the corresponding light emitting display. It can reduce the complexity of the production process and control difficulty. Of course, the connection of the electrode plates in the same position on the inner walls to different control signal input terminals can also realize the solution of the present disclosure, and shall also fall within the scope of the disclosure.

Figure 9:
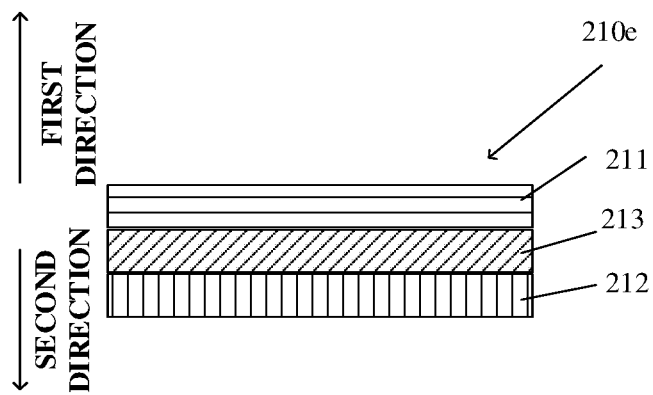
FIG. 9 is a schematic structural view of a bidirectional light emitting element of the display substrate shown in FIG. 1.

FIG. 9 is a schematic structural view of the bidirectional light emitting element of the display substrate shown in FIG. 1. In particular implementations, there may be various specific structures for each bidirectional light emitting element 210o or 210e in the bidirectional light emitting element array 200, and one of the structures will be described below.

In embodiments of the present disclosure, the bidirectional light emitting element may include a first transparent electrode, a second transparent electrode, and a light emitting layer positioned between the first transparent electrode and the second transparent electrode.

In embodiments of the present disclosure, the bidirectional light emitting element may be a color photoelectroluminescent element. The bidirectional light emitting element array includes bidirectional light emitting elements of N colors. Among any N consecutive columns of bidirectional light emitting elements, the color of light emitted by each column of bidirectional light emitting elements is different from the colors of light emitted by other columns of bidirectional light emitting elements. For the odd-numbered columns of bidirectional light emitting elements, among any N consecutive columns of bidirectional light emitting elements, the color of light emitted by each column of bidirectional light emitting elements is different from the colors of light emitted by other columns of bidirectional light emitting elements. For the even-numbered columns of bidirectional light emitting elements, among any N consecutive columns of bidirectional light emitting elements, the color of light emitted by each column of bidirectional light emitting elements is different from the colors of light emitted by other columns of bidirectional light emitting elements. As shown in FIG. 9, each bidirectional light emitting element 210o or 210e (by example of 210e in the figure) includes a first transparent electrode layer 211, a second transparent electrode layer 212, and a light emitting layer 213 positioned between the first transparent electrode 211 and the second transparent electrode layer 212. This makes it possible to emit light in both the upward and downward directions.

Of course, in practical applications, the above-mentioned bidirectional light emitting element 210o or 210e may adopt other structures, and on the premise that bidirectional light emission can be realized, the specific structure used does not affect the scope of the present disclosure.

In particular implementations, as shown in FIG. 1, the bidirectional light emitting element 210o or 210e may be specifically a color electroluminescent element. The bidirectional light emitting element 210o or 210e included in the bidirectional light emitting element array 200 may have three color types, R (red), G (green), and B (blue). Starting from the left side, the first column of bidirectional light emitting elements 210o are R, the second column of bidirectional light emitting elements 210e are G, and the third column of bidirectional light emitting elements 210o are B. They are periodically arranged in such a distribution manner. Thus, among any three consecutive columns of bidirectional light emitting elements 210, the color of light emitted by each column of bidirectional light emitting elements is different from the colors of light emitted by other columns of bidirectional light emitting elements. Also, for columns of bidirectional light emitting elements 210o positioned on the upper surface of the transparent base 1 or columns of bidirectional light emitting elements 210e positioned on the lower surface of the transparent base 2, it is also satisfied that among any three consecutive columns of bidirectional light emitting elements, the color of light emitted by each column of bidirectional light emitting elements is different from the colors of light emitted by other columns of bidirectional light emitting elements. Therefore, during the upward or downward single-sided display (including single-sided 2D or single-sided 3D), the colors emitted by the adjacent three columns of bidirectional light emitting elements are different, and during the bidirectional display, it is also capable of making the colors emitted by the adjacent three columns of bidirectional light emitting elements different, so as to ensure the delicate level of the displayed picture.

It is not difficult to understand that the above-described bidirectional light emitting elements $210o$ and $210e$ may also be white electroluminescent elements, in which case one color film substrate may be provided above and below the display substrate for color display. Similarly, the arrangement of pixels in the color film substrate here may be the same as the arrangement in FIG. 1, that is, any three consecutive columns of pixels include a red pixel column R, a blue pixel column B and a green pixel column G. And any three consecutive columns of odd-numbered columns of pixels or any three consecutive columns of even-numbered columns of pixels include a red pixel column R, a blue pixel column B, and a green pixel column G.

Of course, in particular implementations, the color of the bidirectional light emitting elements $210o$ and $210e$ here or the colors of the color film substrate may not be R, G, and B. For example, the colors may include three kinds of C (cyan), M (magenta), K (black), or four kinds of R, G, B, W (white) or other types. The corresponding technical solutions should fall within the scope of the present disclosure.

Figure 10:
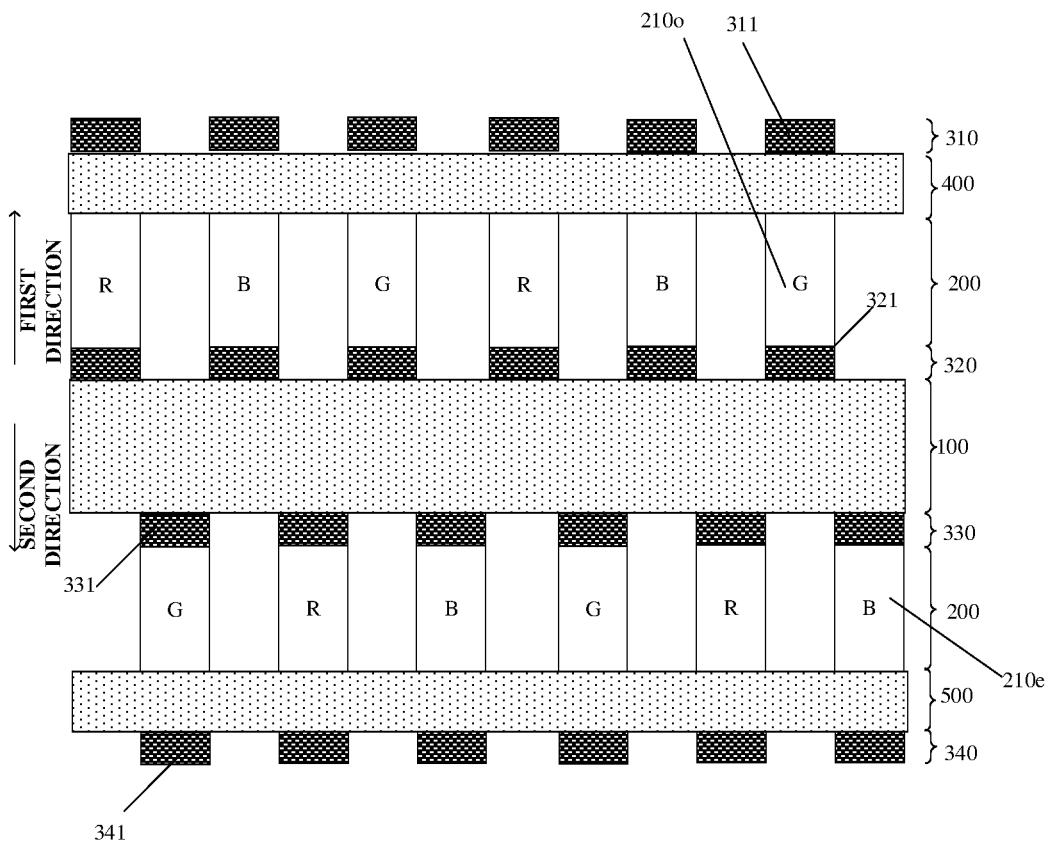
FIG. 10 is a schematic structural view of a display substrate provided according to a second embodiment of the present disclosure.

FIG. 10 is a schematic structural view of the display substrate provided according to the second embodiment of the present disclosure. The display substrate provided by the second embodiment of the present disclosure can be referred to FIG. 10, and differs from the first embodiment in that it further includes two transparent cover plates 400 and 500. The transparent cover plate 400 is arranged above the bidirectional light emitting element $210o$ positioned on the upper surface of the transparent base 100, and the first variable grating array 310 is formed on the upper surface of the first transparent cover plate 400. The transparent cover plate 500 is arranged below the bidirectional light emitting element $210e$ positioned on the lower surface of the transparent base 100, and the fourth variable grating array 340 is formed on the lower surface of the transparent cover plate 500.

This has the advantage that the difficulty of manufacturing a variable grating array can be reduced.

Further, when the bidirectional light emitting elements $210o$ and $210e$ mentioned above are the light emitting elements in FIG. 10, the upper electrode of the bidirectional light emitting element $210o$ positioned on the upper surface of the transparent base 100 may be manufactured on the lower surface of the transparent cover plate 400. The lower electrode of the bidirectional light emitting element $210e$ positioned on the lower surface of the transparent base 100 may be manufactured on the upper surface of the transparent cover plate 500. Of course, the technical solution of the present disclosure can also be realized by not manufacturing the electrodes of the bidirectional light emitting elements $210o$ and $210e$ on the transparent cover plates. Accordingly, in this case, the first variable grating array 310 may be manufactured on the lower surface of the transparent cover plate 400, the fourth variable grating array 340 may be manufactured on the upper surface of the transparent cover plate 500, and the corresponding technical solutions can also achieve the basic object of the present disclosure and shall fall within the scope of the present disclosure.

Figure 11:
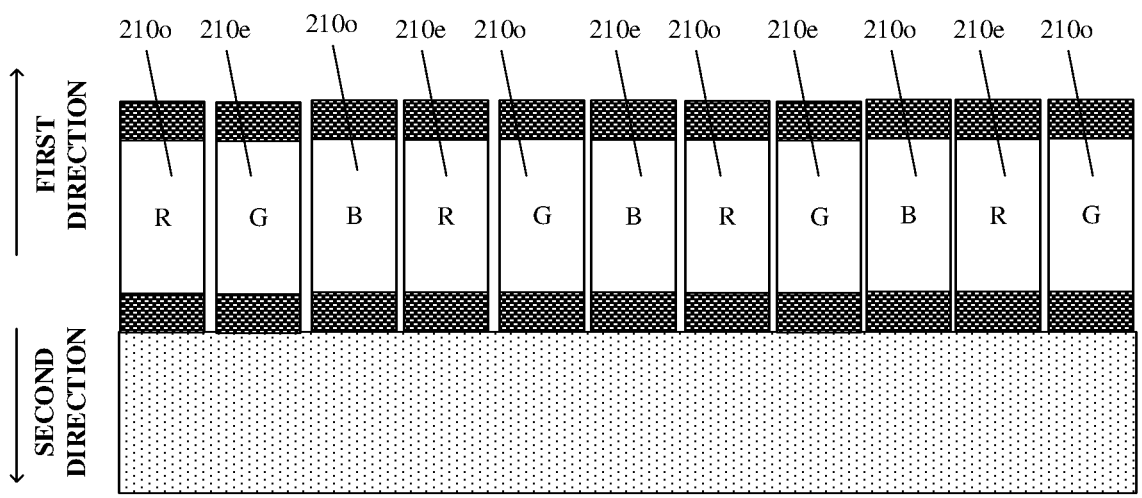
FIG. 11 is a schematic structural view of a display substrate provided according to a third embodiment of the present disclosure.

FIG. 11 is a schematic structural view of the display substrate provided according to the third embodiment of the present disclosure. The display substrate provided by the third embodiment of the present disclosure may be referred to FIG. 11, and differs from Embodiment 1 in that, in Embodiment 3, each of the bidirectional light emitting elements $210o$ and $210e$ in the bidirectional light emitting element array 200 is positioned on the upper surface of the transparent base 100. And at this time, the third variable grating array 330 and the fourth variable grating array 340 may also be manufactured above the transparent base 100. There is no need for a transparent cover plate or there is just a need for only one transparent cover plate to be provided above the bidirectional light emitting elements $210o$ and $210e$. Such a solution can also achieve the basic object of the present disclosure, and the corresponding technical solution shall also fall within the scope of the present disclosure.

Embodiments of the present disclosure further provide a manufacturing method of a display substrate that can be used to manufacture a display substrate according to any one of the above embodiments. The method includes: forming a transparent base; forming a bidirectional light emitting element array that can emit light in both a first direction and a second direction perpendicular to the transparent base, a first variable grating array configured to transmit or block the light emitted by odd-numbered columns of bidirectional light emitting elements in the first direction, a second variable grating array configured to transmit or block the light emitted by odd-numbered columns of bidirectional light emitting elements in the second direction, a third variable grating array configured to transmit or block the light emitted by even-numbered columns of bidirectional light emitting elements in the first direction, and a fourth variable grating array configured to transmit or block the light emitted by even-numbered columns of bidirectional light emitting elements in the second direction. Each variable grating array can realize the transition between a transparent state and an opaque state under control of an accessed control signal to transmit or block the emitted light.

With the display substrate provided by embodiments of the present disclosure, the single-sided 2D display, the double-sided 2D display, and the naked-eye 3D display can be realized.

In particular implementations, the bidirectional light emitting element arrays may be manufactured on the transparent base by a patterning process and each variable grating array may be manufactured on the above-mentioned transparent base by a patterning process (when transparent cover plates are included, the variable grating arrays that should be manufactured on the transparent cover plates may also be manufactured on the transparent cover plates by a pattering process). The specific process for patterning can refer to the prior art and will not be described in detail here.

When the above-described method is used for manufacturing the display substrate as described in the first embodiment or the second embodiment, forming a bidirectional light emitting element array on the transparent base specifically includes: forming odd-numbered columns of bidirectional light emitting elements on a surface of the transparent base in the first direction, and forming even-numbered columns of bidirectional light emitting elements on a surface of the transparent base in the second direction. When the above-described method is used for manufacturing the display substrate as described in the third embodiment, forming a bidirectional light emitting element array on the transparent base specifically includes: forming odd-numbered columns of bidirectional light emitting elements and even-numbered columns of bidirectional light emitting elements on a face of the transparent base in the first direction.

Embodiments of the present disclosure further provide a display device including the display substrate of any one of the above. The display device may be specifically a device having a display function such as a tablet computer, a mobile phone, an IPAD, an electronic paper, or the like.

The forgoing is merely about the specific mode of carrying out the present disclosure, but the scope of the present disclosure for protection is not limited thereto. Any modification or substitution easily conceivable to those skilled in the art within the technical scope revealed by embodiments of the present disclosure shall be encompassed within the scope of the present disclosure for protection. Therefore, the protection scope of the present disclosure shall be based on the protection scope of the claims.

The invention claimed is:

1. A display substrate comprising:
a transparent base including a first direction side and a second direction side;
a bidirectional light emitting element array positioned on the first direction side and the second direction side of the transparent base, wherein the bidirectional light emitting element array comprises a plurality of bidirectional light emitting elements configured to emit light in a first direction and a second direction perpendicular to the transparent base;
a first variable grating array configured to transmit or block the light emitted by odd-numbered columns of the bidirectional light emitting elements in the first direction;
a second variable grating array configured to transmit or block the light emitted by the odd-numbered columns of the bidirectional light emitting elements in the second direction;
a third variable grating array configured to transmit or block the light emitted by even-numbered columns of the bidirectional light emitting elements in the first direction; and
a fourth variable grating array configured to transmit or block the light emitted by the even-numbered columns of the bidirectional light emitting elements in the second direction;
wherein the variable grating arrays are configured to realize a transition between a transparent state and an opaque state under the control of a plurality of control signals to transmit or block the emitted light;
wherein the odd-numbered columns of the bidirectional light emitting elements are positioned on the first direction side of the transparent base, and the even-numbered columns of the bidirectional light emitting elements are positioned on the second direction side of the transparent base;
wherein the first variable grating array and the second variable grating array are positioned over the first direction side of the transparent base, and the third variable grating array and the fourth variable grating array are positioned over the second direction side of the transparent base;
wherein a control signal of the plurality of control signals is applicable to make the third variable grating array transparent, and the first variable grating array, the second variable grating array and the fourth variable grating array opaque when performing 3D display in the first direction; and
wherein another control signal of the plurality of control signals is applicable to make the second variable grating array transparent, and the first variable grating array, the third variable grating array and the fourth variable grating array opaque when performing 3D display in the second direction.

2. The display substrate according to claim 1,
wherein the second variable grating array is positioned on the surface of the transparent base toward the first direction, wherein the odd-numbered columns of the bidirectional light emitting elements are positioned on the surface of the second variable grating array toward the first direction, wherein the third variable grating array is positioned on the surface of the transparent base toward the second direction, and wherein the even-numbered columns of the bidirectional light emitting elements are positioned on the surface of the third variable grating array toward the second direction; and
wherein the display substrate further comprises a first transparent cover plate and a second transparent cover plate, wherein the first transparent cover plate is arranged on the first direction side of the odd-numbered columns of the bidirectional light emitting elements, wherein the first variable grating array is positioned on the first transparent cover plate, wherein the second transparent cover plate is arranged on the second direction side of the even-numbered columns of the bidirectional light emitting elements, and wherein the fourth variable grating array is positioned on the second transparent cover plate.

3. The display substrate according to claim 2, wherein each variable grating array comprises a plurality of strip-shaped electrode cases, and wherein each of the strip-shaped electrode cases comprises a transparent case body, a first pair of electrode plates and a second pair of electrode plates positioned on inner side walls of the transparent case body, a transparent liquid in the transparent case body, and opaque charged particles mixed in the transparent liquid; and
wherein the first pair of electrode plates are perpendicular to the transparent base and are configured to form an electric field parallel to the transparent base, and wherein the second pair of electrode plates are parallel to the transparent base and are configured to form an electric field perpendicular to the transparent base.

4. The display substrate according to claim 1, wherein each variable grating array comprises a plurality of strip-shaped electrode cases, and wherein each of the strip-shaped electrode cases comprises a transparent case body, a first pair of electrode plates and a second pair of electrode plates positioned on inner side walls of the transparent case body, a transparent liquid in the transparent case body, and opaque charged particles mixed in the transparent liquid; and
wherein the first pair of electrode plates are perpendicular to the transparent base and are configured to form an electric field parallel to the transparent base, and wherein the second pair of electrode plates are parallel to the transparent base and are configured to form an electric field perpendicular to the transparent base.

5. The display substrate according to claim 4, wherein in each variable grating array, every strip-shaped electrode case is connected to the same control signal input terminal.

6. The display substrate according to claim 1, wherein each of the bidirectional light emitting elements comprises a first transparent electrode, a second transparent electrode, and a light emitting layer positioned between the first transparent electrode and the second transparent electrode.

7. The display substrate according to claim 1, wherein at least one of the bidirectional light emitting elements is a color photo-electroluminescent element, and wherein the bidirectional light emitting elements include one or more bidirectional light emitting elements of N colors;
   wherein among any N consecutive columns of the bidirectional light emitting elements, the color of light emitted by each column of the bidirectional light emitting elements is different from the colors of light emitted by other columns of the bidirectional light emitting elements;
   wherein for the odd-numbered columns of the bidirectional light emitting elements, among any N consecutive columns of the bidirectional light emitting elements, the color of light emitted by each column of the bidirectional light emitting elements is different from the colors of light emitted by other columns of the bidirectional light emitting elements;
   wherein for the even-numbered columns of the bidirectional light emitting elements, among any N consecutive columns of the bidirectional light emitting elements, the color of light emitted by each column of the bidirectional light emitting elements is different from the colors of light emitted by other columns of the bidirectional light emitting elements; and
   wherein N is an integer more than one.

8. A display driving method for driving the display substrate according to claim 1, the method comprising:
   applying a third control signal of the control signals to make the first variable grating array and the third variable grating array transparent and make other variable grating arrays opaque to perform single-sided 2D display in the first direction;
   applying a fourth control signal of the control signals to make the second variable grating array and the fourth variable grating array transparent and make other variable grating arrays opaque to perform single-sided 2D display in the second direction; and
   applying a fifth control signal of the control signals to make the first variable grating array and the fourth variable grating array transparent and make other variable grating arrays opaque to perform double-sided 2D display.

9. The display driving method according to claim 8, wherein the second variable grating array is positioned on the surface of the transparent base toward the first direction, wherein the odd-numbered columns of the bidirectional light emitting elements are positioned on the surface of the second variable grating array toward the first direction, wherein the third variable grating array is positioned on the surface of the transparent base toward the second direction, and wherein the even-numbered columns of the bidirectional light emitting elements are positioned on the surface of the third variable grating array toward the second direction; and
   wherein the display substrate further comprises a first transparent cover plate and a second transparent cover plate, wherein the first transparent cover plate is arranged on the first direction side of the odd-numbered columns of the bidirectional light emitting elements, wherein the first variable grating array is positioned on the first transparent cover plate, wherein the second transparent cover plate is arranged on the second direction side of the even-numbered columns of the bidirectional light emitting elements, and wherein the fourth variable grating array is positioned on the second transparent cover plate.

10. The display driving method according to claim 8, wherein each variable grating array comprises a plurality of strip-shaped electrode cases, and wherein each of the strip-shaped electrode cases comprises a transparent case body, a first pair of electrode plates and a second pair of electrode plates positioned on inner side walls of the transparent case body, a transparent liquid in the transparent case body, and opaque charged particles mixed in the transparent liquid; and
   wherein the first pair of electrode plates are perpendicular to the transparent base and are configured to form an electric field parallel to the transparent base, and wherein the second pair of electrode plates are parallel to the transparent base and are configured to form an electric field perpendicular to the transparent base.

11. The display driving method according to claim 8, wherein in each variable grating array, every strip-shaped electrode case is connected to the same control signal input terminal.

12. The display driving method according to claim 8, further comprising:
   applying the control signal to make the third variable grating array transparent and other variable grating arrays opaque to perform 3D display in the first direction; and
   applying the other control signal to make the second variable grating array transparent and other variable grating arrays opaque to perform 3D display in the second direction.

13. A manufacturing method for a display substrate according to claim 1, the method comprising:
   forming the transparent base having the first direction side and the second direction side; and
   forming the bidirectional light emitting element array and a plurality of variable grating arrays on the first direction side and the second direction side of the transparent base;
   wherein the plurality of variable grating arrays comprise the first variable grating array, the second variable grating array, the third variable grating array, and the fourth variable grating array; and
   wherein forming the bidirectional light emitting element array includes forming the odd-numbered columns of the bidirectional light emitting elements on the first direction side of the transparent base, and forming the even-numbered columns of the bidirectional light emitting elements on the second direction side of the transparent base.

14. A display device comprising the display substrate according to claim 1.

15. The display substrate according to claim 1, wherein each variable grating array comprises a plurality of strip-shaped electrode cases, and wherein each of the strip-shaped electrode cases comprises a transparent case body, a first pair of electrode plates and a second pair of electrode plates positioned on inner side walls of the transparent case body, a transparent liquid in the transparent case body, and opaque charged particles mixed in the transparent liquid; and
   wherein the first pair of electrode plates are perpendicular to the transparent base and are configured to form an electric field parallel to the transparent base, and wherein the second pair of electrode plates are parallel to the transparent base and are configured to form an electric field perpendicular to the transparent base.

16. The display substrate according to claim 1, wherein in the bidirectional light emitting element array, any three consecutive columns of the odd-numbered columns of the bidirectional light emitting elements or any three consecutive columns of the even-numbered columns of the bidirectional light emitting elements include a first column with a first color, a second column with a second color and a third column with a third color; and wherein the first color is red, the second color is green, and the third color is blue.

17. The display substrate according to claim 1, wherein an orthographic projection of the odd-numbered columns of the bidirectional light emitting elements on the transparent base and an orthographic projection of the even-numbered columns of the bidirectional light emitting elements on the transparent base do not overlap with each other.

18. The display substrate according to claim 1, wherein an orthographic projection of the odd-numbered columns of the bidirectional light emitting elements on the transparent base, an orthographic projection of the first variable grating array on the transparent base, and an orthographic projection of the second variable grating array on the transparent base overlap with each other; and wherein an orthographic projection of the even-numbered columns of the bidirectional light emitting elements on the transparent base, an orthographic projection of the third variable grating array on the transparent base, and an orthographic projection of the fourth variable grating array on the transparent base overlap with each other.

* * * * *